US005252983A

United States Patent [19]

Sezai

[11] Patent Number: 5,252,983
[45] Date of Patent: Oct. 12, 1993

[54] METHOD FOR REDUCING SIDE LOBES IN ANTENNA PATTERNS

[75] Inventor: Toshihiro Sezai, Tokyo, Japan

[73] Assignee: National Space Development Agency of Japan, Tokyo, Japan

[21] Appl. No.: 933,673

[22] Filed: Aug. 24, 1992

[30] Foreign Application Priority Data

Sep. 11, 1991 [JP] Japan .................................. 3-258772

[51] Int. Cl.$^5$ ............................ G01S 3/16; G01S 3/28
[52] U.S. Cl. .................................................... 342/382
[58] Field of Search ......................................... 342/382

[56] References Cited

U.S. PATENT DOCUMENTS 4,612,549  9/1986  Geyer, Jr. et al. ................... 342/382
4,888,593  12/1989 Friedman et al. ................... 342/382
5,021,793  6/1991  Stangel et al. .

FOREIGN PATENT DOCUMENTS 358342   3/1990  European Pat. Off. .
91/10917 7/1991  World Int. Prop. O. .

OTHER PUBLICATIONS

IGARSS '89, 12th Canadian Symposium on Remote Sensing, Jul. 1989, Vancouver, Canada, pp. 268-270, Arai et al., "Beam Compressed Microwave Scanning Radiometer".

Primary Examiner—Theodore M. Blum
Attorney, Agent, or Firm—Armstrong, Westerman, Hattori, McLeland & Naughton

[57] ABSTRACT

A method for reducing side lobes wherein an antenna system comprises a main antenna and a sub antenna which does not have an isotropic antenna pattern in a direction (X direction) of an orientation of a side lobe of the main antenna to be reduced which is arranged in such a way that the sub antenna adjoins the main antenna in the direction (Y direction) perpendicular to the X direction and the beam axis of the sub antenna coincides with the beam axis of the main antenna; wherein an antenna beam of the antenna system is scanned in the X direction and a signal received with the main antenna is multiplied by a signal received with the sub antenna on the condition that phases of both signals coincide with each other.

6 Claims, 5 Drawing Sheets

METHOD FOR REDUCING SIDE LOBES IN ANTENNA PATTERNS

BACKGROUND OF THE INVENTION

The present invention relates to a method for processing antenna patterns of antenna systems for receiving radio waves, more specifically, a method for reducing side lobes in antenna patterns without widening beam widths.

A beam width and a side lobe are indices for describing the characteristics of antenna patterns of general antennas including receiving antennas. Narrower beam widths or lower side lobes give better antenna pattern characteristics.

A multiplicative array is known as a method for reducing beam widths by multiplying each signal received with plural antennas. FIG. 1 shows the constitution of such an antenna which reduces beam widths. In this figure, 101 is a main antenna such as an array antenna comprising plural radiating elements which are arranged along a straight line with equal spaces and 102 is a reference antenna. The reference antenna 102 is arranged apart from the main antenna 101 in the X direction which is the orientation of the beam width to be reduced. 103 is a multiplier which multiplies the signal received with the main antenna 101 by the signal received with the reference antenna 102. In this antenna system having such a constitution, each signal received with antennas 101 and 102 is applied to the multiplier 103 with the same phase to perform the multiplication between the directional characteristic of the main antenna 101 and that of the reference antenna so that the resulting synthesized directional characteristic shows a reduction in the beam width.

The beam width and the side lobe, the indices for the antenna pattern, show antinomical relationship each other. That is, when the beam width is reduced by the conventional method described above, side lobes become high. On the other hand, when side lobes are reduced the beam width becomes wide.

Therefore, for example in radar antennas, when side lobes are reduced, then the beam width is widened and resolution or ability to distinguish targets gets degraded. As a result, the radar could misidentify plural targets as single target. On the other hand, when the beam width is reduced, side lobes become high and the radar might misidentify a target which exists in a certain direction of some side lobes as if it exists in the observation direction although there is nothing in the observation direction.

As described above, the beam width and the side lobe have characteristics conflicting with each other, hence it is impossible to optimize both of these at the same time. Therefore, compromises between the beam width and side lobes have been required such that the beam width is minimized on a certain condition of side lobes, or side lobes are minimized on a certain condition of a beam width as in Chebyshev distribution.

SUMMARY OF THE INVENTION

It is an object of the present invention to solve the above problems in conventional antenna system. It is a more specific object of this invention to provide a method for reducing side lobes in antenna pattern without widening a beam width.

In this invention, in order to achieve the above object, an antenna system comprises a main antenna for receiving radio waves and one or more sub antennas which do not have an isotropic antenna pattern in a first direction of an orientation of a side lobe to be reduced of the main antenna which is arranged in such a way that the sub antenna adjoins the main antenna in a second direction perpendicular to the first direction and the beam axis of the sub antenna coincides with the beam axis of the main antenna; wherein an antenna beam of the antenna system is scanned in the first direction and a signal received with the main antenna is multiplied by a signal received with the sub antennas by a means of multiplication on the condition that phases of both signals coincide with each other.

In general cases, except for the special isotropic case, an antenna pattern shows the maximum magnitude in the beam axis direction. Let the maximum magnitude 1 (that is, the magnitude is normalized with respect to the maximum magnitude), then any magnitude, except for in the beam axis direction, is less than 1. Therefore, if, as described above, the signal received with the main antenna is multiplied by the signal received with the sub antenna which does not have an isotropic antenna pattern on the condition that the phase of these signals are same, then the resultant multiplied values become less than values of the main antenna except for in the beam axis direction because the main antenna pattern is multiplied by the sub antenna pattern which has less than 1 except for in the beam axis direction. In this way, side lobes can be reduced without widening a beam width.

DESCRIPTION OF THE PREFERRED EMBODIMENTS

Figure 2:
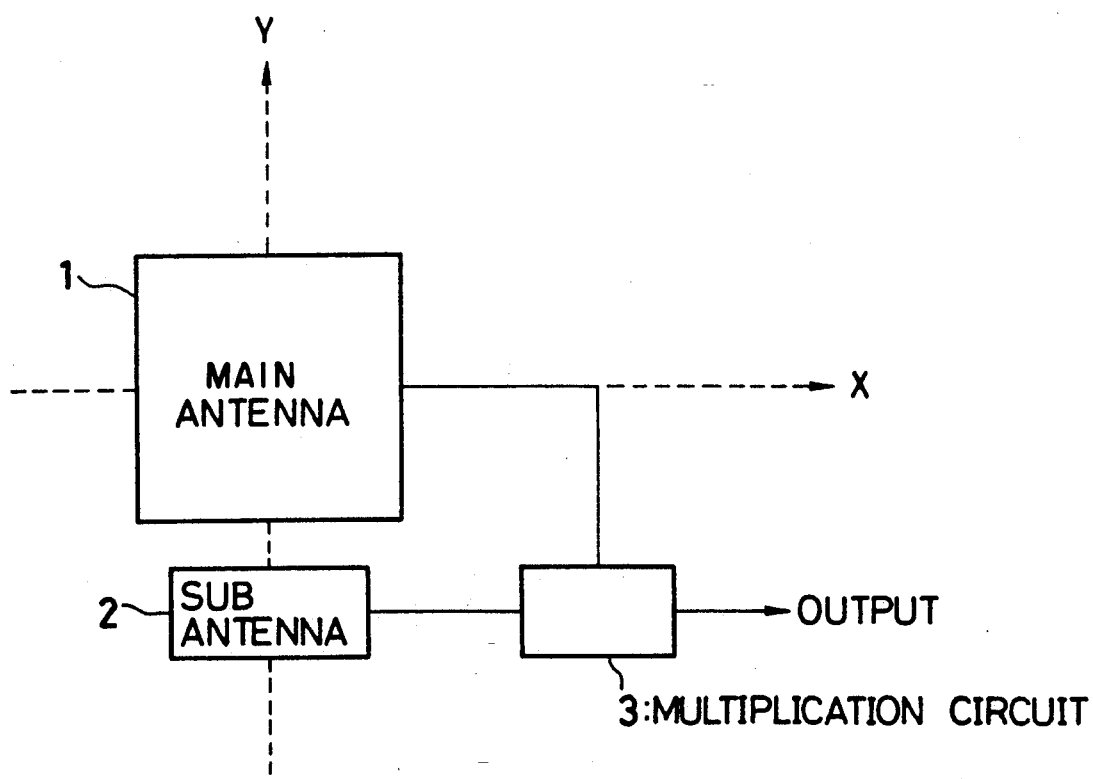
FIG. 2 is a conceptual diagram of a low side-lobe antenna for explanation of a method for reducing side lobes in antenna pattern embodying the present invention.

Explanation of an embodiment of this invention is given in the following description. FIG. 2 is a conceptual diagram of a low side-lobe antenna system showing a method for reducing side lobes in antenna pattern according to the present invention. In this figure, 1 is a main antenna for receiving radio waves such as a horn antenna or an array antenna. 2 is a sub antenna arranged in such a way that it adjoins the main antenna 1 in the Y direction perpendicular to the X direction and that its beam axis coincides with the beam axis of the main antenna 1 so that the side lobe in the X direction in the antenna pattern of the main antenna 1 is reduced. Any kind of antennas, except those which have an isotropic antenna pattern in the X direction, can be utilized as a sub antenna 2 such as a dipole antenna, a horn antenna and an array antenna. 3 is a multiplier for performing multiplication between the signal received with the main antenna 1 and the signal received with the sub antenna 2. In order to scan the beam of the antenna system comprising the main antenna 1 and the sub antenna 2 in the X direction, the antenna system can be mechanically moved on a rotary table, or otherwise, phased-array antennas are used for each antenna and the feeding phases at each antenna are controlled so that the beam is scanned electronically with no mechanical motion.

When radio waves arrive at such an antenna system whose beam is scanned in the X direction, the main antenna 1 and the sub antenna 2 output the received signals depending on each antenna pattern. These output signals are multiplied each other by the multiplier 3 on the condition that the phase of these signals coincide with each other, and the output of the multiplier gives the final output corresponding to the main antenna pattern with reduced side lobes.

Figure 3A:
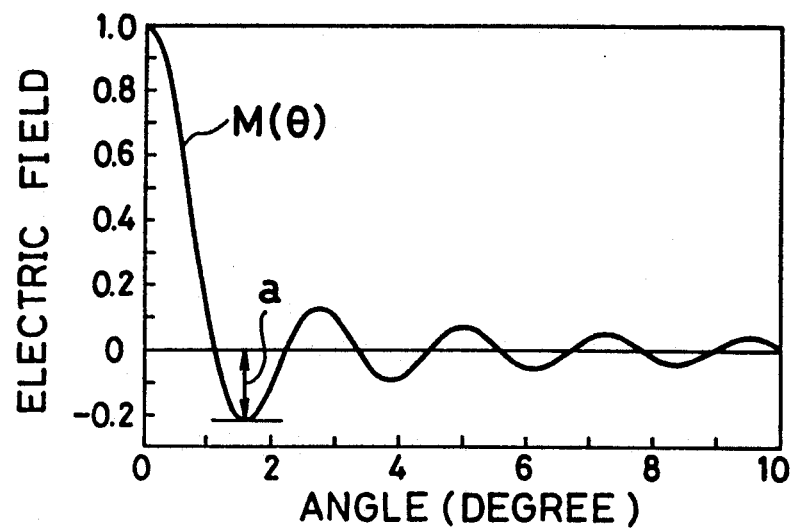
FIG. 3A through 3C are graphs showing patterns of each antenna in the antenna system of FIG. 2 and resultant synthesized pattern after multiplication.
Figure 3B:
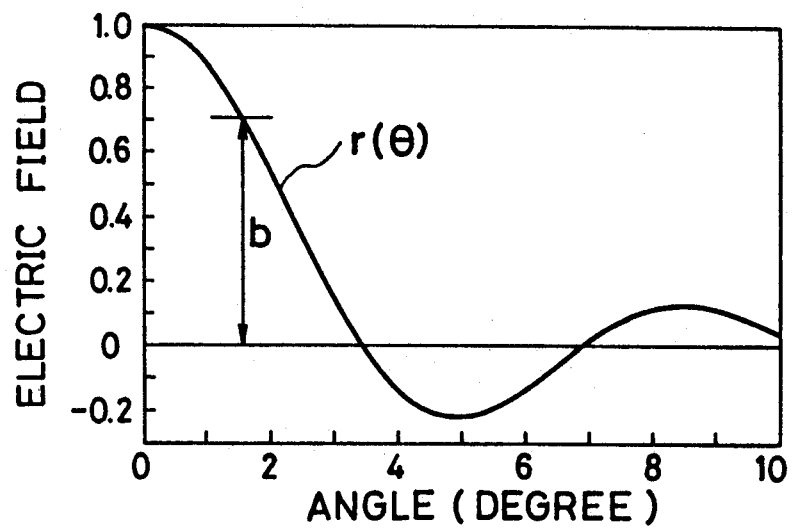
Figure 3C:
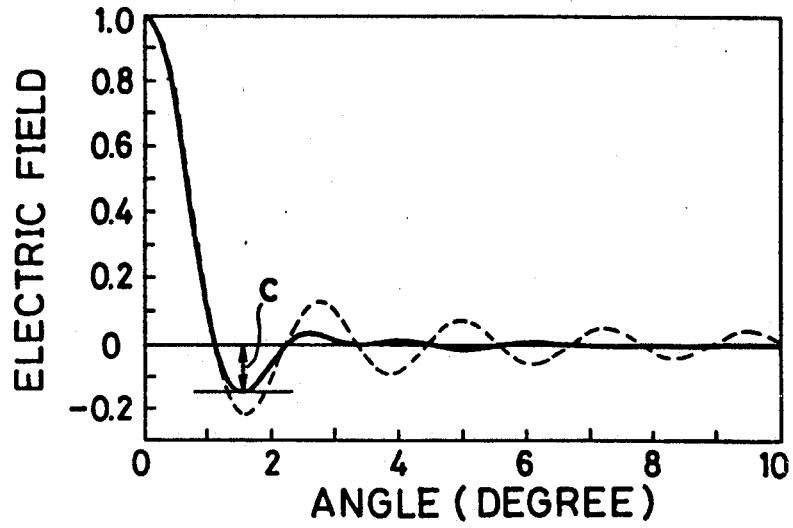

FIG. 3A through 3C show simulated characteristics of an antenna system comprising a main antenna whose X-direction length is about twelve times as large as the wavelength of received radio waves and the sub antenna having a length of a thirds of the main-antenna length. FIG. 3A shows pattern $M(\theta)$ of the main antenna, and FIG. 3B shows pattern $r(\theta)$ of the sub antenna. FIG. 3C shows the synthesized pattern (solid line) resulting from multiplication between pattern $M(\theta)$ of the main antenna and pattern $r(\theta)$ of the sub antenna, and also a pattern of the main antenna (broken line). In FIG. 3C, the magnitude c of a side lobe in the synthesized pattern is the product of the magnitude a of the side lobe in pattern $M(\theta)$ of the main antenna and the magnitude b of the side lobe in pattern $r(\theta)$ of the sub antenna. Here, the magnitude of b is always less than 1 except at 0 degree (the beam axis direction) because the pattern $r(\theta)$ of the sub antenna is not isotropic. Therefore, the magnitude c of the side lobe in the synthesized pattern is always less than the magnitude a of the side lobe in pattern $M(\theta)$ of the main antenna. Hence, reduction in side lobes can be achieved without widening the beam width. As can be seen from FIG. 3C, the present invention also makes a some contribution to the reduction in the beam width.

Figure 1:
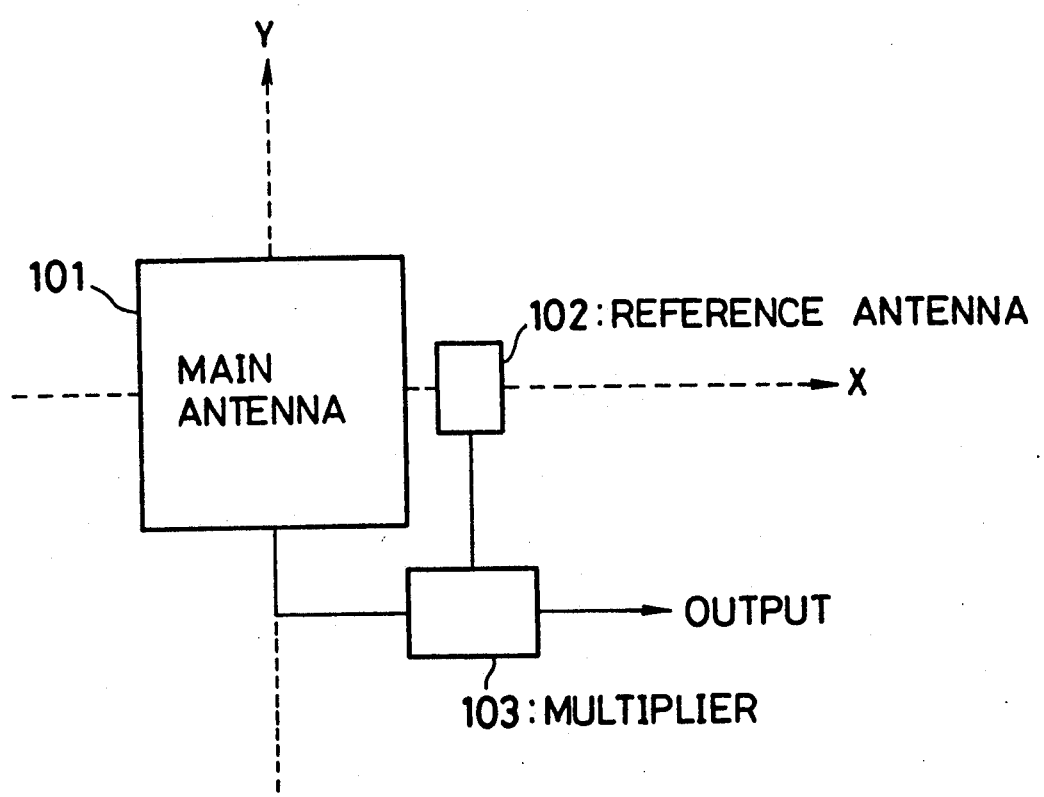
FIG. 1 is a schematic diagram of a conventional antenna system for reducing a beam.
Figure 4:
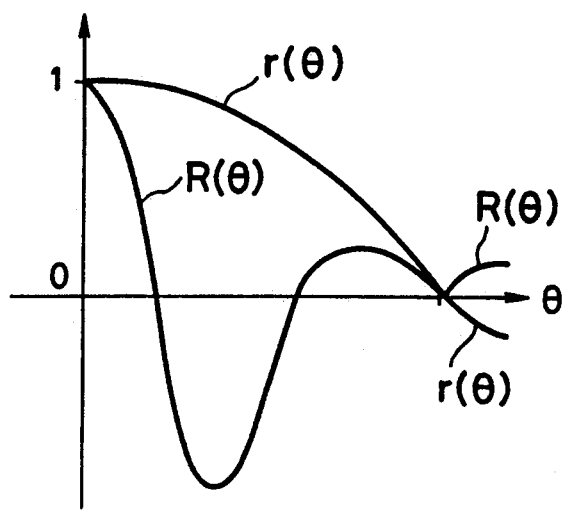
FIG. 4 is a graph showing a pattern of a sub antenna of a conventional antenna system with a reduced beam width.

On the other hand, in the case of a conventional antenna system shown in FIG. 1, in which a sub antenna is arranged apart from a main antenna in the X direction, the pattern $R(\theta)$ of the sub antenna in the X direction is described by the pattern $r(\theta)$ of the sub antenna of the present invention multiplied by $\cos(k \cdot d \cdot \sin\theta)$, where $k = 2\pi/\lambda$, d is a distance between the center of the main antenna and the center of the sub antenna, $\theta$ is an angle of the X direction, and $\lambda$ is a wavelength of the received radio wave. That is, in the present invention the sub antenna does not have any separation from the main antenna in the X direction while it has some separation in the Y direction, but, in contrast, the conventional antenna system has separation d in the X direction. As a result, the pattern $R(\theta)$ of the sub antenna of the conventional antenna system is represented by $r(\theta)$ multiplied by $\cos(k \cdot d \cdot \sin\theta)$, as described above, and it has a short periodicity as shown in FIG. 4. Consequently when the pattern $M(\theta)$ of the main antenna is multiplied by this pattern $R(\theta)$ of the sub antenna, the reduction in beam width can be achieved but large side lobes arise.

Figure 5:
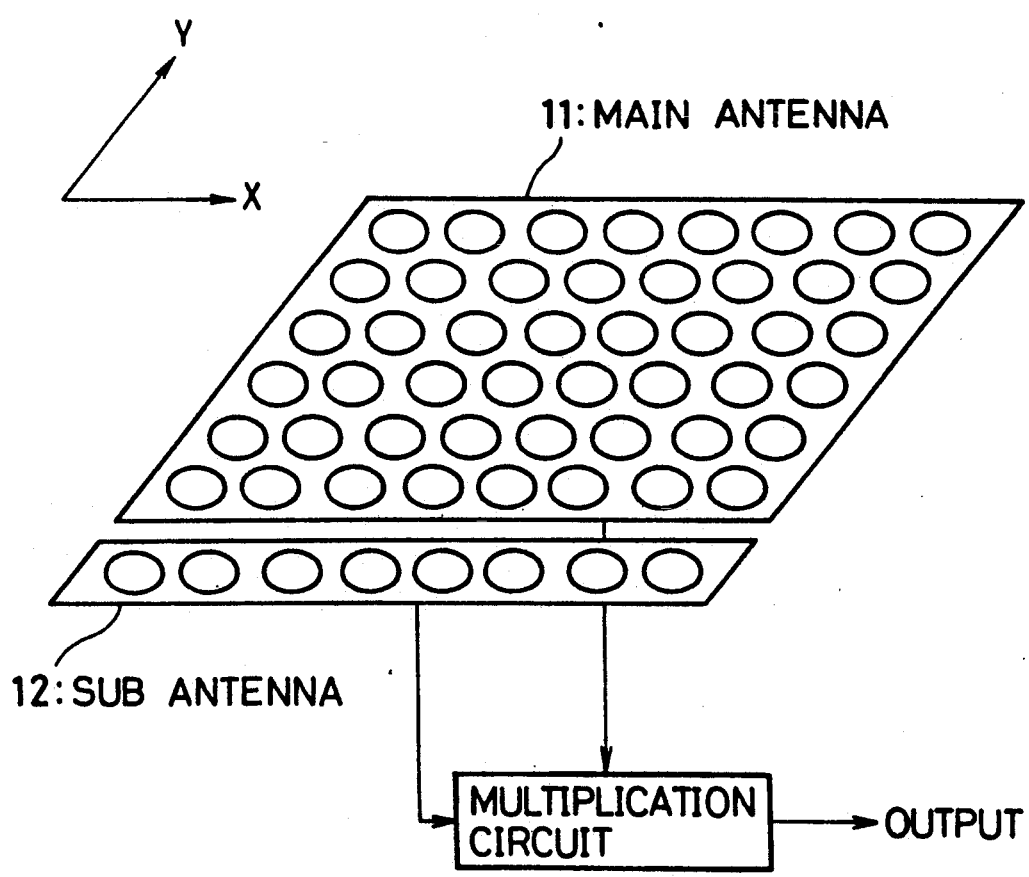
FIG. 5 is a schematic diagram of a low side-lobe antenna system embodying the present invention.

Referring to FIG. 5, an example of constitution of the antenna system is described more concretely next. In this example of the constitution, circular patch array antennas are utilized for both of a main antenna 11 and a sub antenna 12, and the sub antenna 12 is arranged apart from the main antenna 11 in the Y direction.

Figure 6:
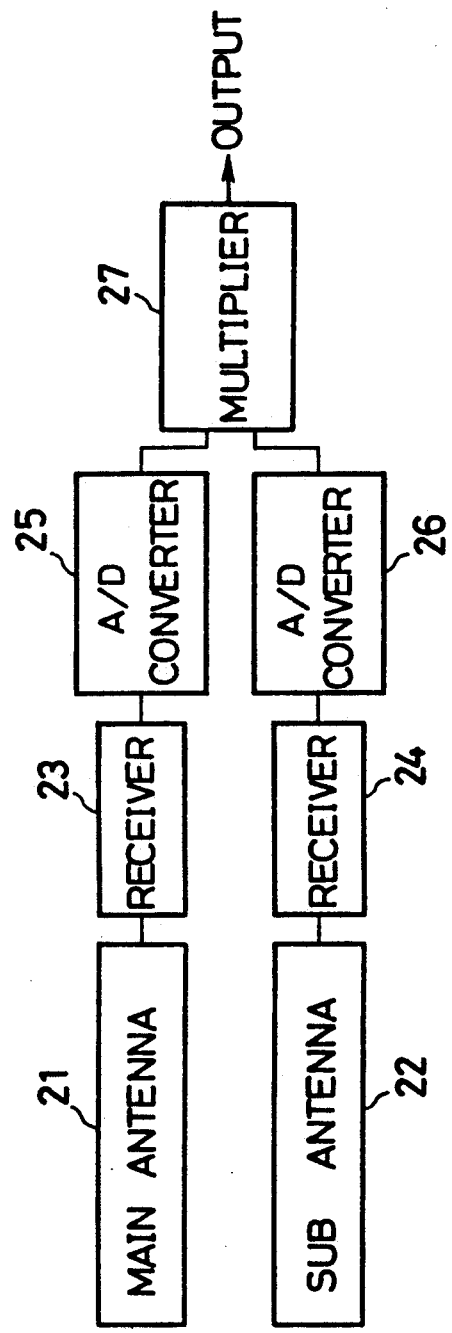
FIG. 6 is a block diagram of a multiplier for showing an example of a circuit constitution.

As for a multiplication circuit, when the multiplication is carried out in an analogue way, common multiplier circuits or frequency modulators can be used. In order to perform multiplication digitally, known means are available such a means that after the received signal is converted to a digital signal by an analogue-to-digital converter, digital multiplication is carried out. An example of such a means is shown in FIG. 6. In this figure, 21 is a main antenna, 22 is a sub antenna, 23 and 24 are receivers for receiving the radio waves caught by each antenna, 25 and 26 are analogue-to-digital converters which convert the output signal of the receiver 23 and 24 to digital signals, and 27 is a multiplier for making the product of the output of analogue-to-digital converter 25 and the output of analogue-to-digital converter 26. In the multiplication circuit of such a constitution, the radio waves received with the main antenna 21 and the sub antenna 22 are applied to the receiver 23 and 24 to output the DC signals corresponding to the power of received radio waves. These receiver output signals are applied to the analogue-to-digital converter 25 and 26 to convert the signals into the digital data. Furthermore, these digital data are multiplied each other by the multiplier 27 and resultant multiplied data are output.

In the above embodiment, single sub antenna is utilized but plural sub antennas can be used as long as they do not have isotropic directional characteristics. In such a case, there are two following methods available for making multiplication of the signal received with the main antenna. In the first method, after adding the outputs of plural sub antennas, the resultant added output is multiplied by the output of the main antenna. In this case, the sub antennas receive more radio power than the single sub antenna, thus better antenna gain and better signal-to-noise ratio are obtained. In the second method, each output of the plural sub antennas is sequentially multiplied by the output of the main antenna. In this case, it is possible to achieve more reduction in side lobes than single sub antenna system.

In the above embodiments, the antenna beam of the antenna system comprising a main antenna and sub antenna is scanned in the X direction, but the beam can be also scanned in another directions. When the beam is scanned in a direction other than either X or Y direction, then the simultaneous reduction in the beam width in the Y direction can be achieved while the degree of the reduction in side lobes in the X direction becomes slightly degraded.

In this case, the plural sub antenna can be also utilized and the two methods described above can be also used for making multiplication of the signal received with the main antenna.

As described above based on the embodiments, the present invention provides a method in which a sub antenna which does not have an isotropic antenna pattern in the direction of the orientation of a side lobe to be reduced is arranged in such a way that it adjoins a main antenna in the direction perpendicular to the orientation of the side lobe of the main antenna to be reduced and the beam axis of the sub antenna coincides with the beam axis of the main antenna, and each signal received with each antenna is multiplied each other with the same phase to reduce side lobes without widening a beam width of the main antenna.

What is claimed is:

1. A method for reducing side lobes in an antenna pattern, comprising the steps of:
   (a) providing an antenna system which includes:
      a main antenna for receiving radio waves; and
      at least one sub antenna which does not have an isotropic antenna pattern in a first direction coinciding with the orientation of a side lobe of said main antenna to be reduced, said at least one sub antenna being arranged such that said at least one sub antenna adjoins said main antenna in a second direction perpendicular to said first direction and a beam axis of each said at least one sub antenna coincides with a beam axis of said main antenna;
   (b) scanning an antenna beam in said first direction with said antenna system; and
   (c) multiplying a signal received with said main antenna by signals received with said at least one sub antenna as long as phases of each of these signals coincide with each other.

2. A method for reducing side lobes in an antenna pattern as defined in claim 1, wherein said step of providing an antenna system includes providing a plurality of said sub antennas, and wherein said step of multiplying includes the steps of adding together each signal received with each said sub antenna and then multiplying the resultant added signal by said signal received with said main antenna.

3. A method for reducing side lobes in an antenna pattern as defined in claim 1, wherein said step of providing an antenna system includes providing a plurality of said sub antennas, and wherein said step of multiplying includes the steps of sequentially multiplying each signal received with each said sub antenna by said signal received with said main antenna.

4. A method for making a reduction in a beam width in addition to a reduction in side lobes in an antenna pattern, comprising the steps of:
   (a) providing an antenna system which includes:
      a main antenna for receiving radio waves; and at least one sub antenna which does not have an isotropic antenna pattern in a first direction coinciding with an orientation of a side lobe of aid main antenna to be reduced, said at least one sub antenna being arranged such that said sub antenna adjoins said main antenna in a second direction perpendicular to said first direction and a beam axis of each said at least one sub antenna coincides with a beam axis of said main antenna;
   (b) scanning an antenna beam in a direction other than either the first direction or the second direction with said antenna system; and
   (c) multiplying a signal received with said main antenna by signals received with said at least one sub antenna as long as phases of each of these signals coincide with each other.

5. A method for making a reduction in a beam width in addition to a reduction in side lobes in an antenna pattern as defined in claim 4, wherein said step of providing an antenna system includes providing a plurality of said sub antennas, and wherein said step of multiplying further includes the steps of adding together each signal received with each said sub antenna and then multiplying the resultant added signal by the signal received with said main antenna.

6. A method for making a reduction in a beam width in addition to a reduction in side lobes in an antenna pattern as defined in claim 4, wherein said step of providing an antenna system includes providing a plurality of said sub antennas, and wherein said step of multiplying includes the steps of sequentially multiplying each signal received with each said sub antenna by said signal received with said main antenna.

* * * * *